United States Patent [19]
Tanaka

[11] Patent Number: 6,140,997
[45] Date of Patent: Oct. 31, 2000

[54] COLOR FEATURE EXTRACTING APPARATUS AND METHOD THEREFOR CAPABLE OF EASILY TRANSFORMING A RGB COLOR SPACE INTO A COLOR SPACE CLOSE TO HUMAN SENSE

[75] Inventor: Sumiyo Tanaka, Osaka, Japan

[73] Assignee: Minolta Co., Ltd., Osaka, Japan

[21] Appl. No.: 09/153,848

[22] Filed: Sep. 16, 1998

[30] Foreign Application Priority Data

Sep. 19, 1997 [JP] Japan ................................. 9-255316

[51] Int. Cl.[7] .................................................. G06F 17/30
[52] U.S. Cl. ........................ 345/153; 345/147; 345/154; 358/518; 348/590; 348/661
[58] Field of Search ................................ 345/147, 431, 345/432, 149, 150, 153, 154; 358/523, 525, 518; 382/162; 348/661, 590

[56] References Cited

U.S. PATENT DOCUMENTS

| | | | |
|---|---|---|---|
| 5,204,948 | 4/1993 | Kato | 358/520 |
| 5,307,182 | 4/1994 | Maltz | 358/518 |
| 5,489,921 | 2/1996 | Dorff et al. | 345/153 |
| 5,528,261 | 6/1996 | Holt et al. | 345/150 |
| 5,583,666 | 12/1996 | Ellson et al. | 358/518 |
| 5,844,532 | 12/1998 | Silverbrook et al. | 345/89 |
| 5,909,220 | 6/1999 | Sandow | 345/431 |
| 6,011,595 | 1/2000 | Henderson et al. | 348/590 |
| 6,025,885 | 2/2000 | Deter | 348/661 |
| 6,058,207 | 5/2000 | Juijn et al. | 382/162 |

FOREIGN PATENT DOCUMENTS

| | | |
|---|---|---|
| 60-157681 | 8/1985 | Japan . |
| 5-28266 | 2/1993 | Japan . |
| 5-274372 | 10/1993 | Japan . |
| 6-274193 | 9/1994 | Japan . |
| 6-295318 | 10/1994 | Japan . |
| 7-271949 | 10/1995 | Japan . |
| 8-16789 | 1/1996 | Japan . |
| 8-329096 | 12/1996 | Japan . |

*Primary Examiner*—Mark R. Powell
*Assistant Examiner*—Thu-Thao Havan
*Attorney, Agent, or Firm*—Burns, Doane, Swecker & Mathis, LLP

[57] ABSTRACT

A color feature extracting apparatus is provided, which can easily transform a RGB color space into a color space close to the human sense and execute color classification and color region distinction of a digital image in the transformed color space. RGB values of each pixel of a digital image are transformed into HLS values by a color space transforming section. A hue value and a luminosity value of the HLS values are corrected by a hue correcting section and a luminosity correcting section, respectively, so that a region between a green color and a yellow color in a direction of hue and a region between the green color and a light blue color in the direction of hue are narrowed and a region between a red color and the yellow color in the direction of hue is widened in a color space represented by the HLS values. Then, the color features of the digital image are extracted by a color feature extracting section on the basis of the corrected hue value and luminosity value.

9 Claims, 9 Drawing Sheets

HUE CIRCLE WHEN NORMAL HLS
TRANSFORMATION IS EXECUTED

Fig.8

HUE CIRCLE WHEN TRANSFORMATION
IS EXECUTED CONFORMING TO HUMAN SENSE

EXAMPLE IN WHICH EACH PIXEL IS
NUMBERED WITH REGARD TO EACH COLOR

Fig.12

RESULT OF SELECTION OF OBJECT
REGION THROUGH REGION DISTINCTION

COLOR FEATURE EXTRACTING APPARATUS AND METHOD THEREFOR CAPABLE OF EASILY TRANSFORMING A RGB COLOR SPACE INTO A COLOR SPACE CLOSE TO HUMAN SENSE

This application is based on an application No. 9-255316 filed in Japan, the contents of which are hereby incorporated by reference.

BACKGROUND OF THE INVENTION

The present invention relates to a color feature extracting apparatus, color feature extracting method and program storage medium thereof for extracting the color features of an image in an image database apparatus or the like.

Conventionally, when retrieving similar images in an image database, a similarity is decided by a color and an occupation ratio of the color to each image by classifying the color features of the images according to each specified color and giving the classified color as a key to the images or giving the color features directly to the image information. As a color feature extracting apparatus for use in retrieving such similar images, there is proposed one which extracts the color features of a digital image, each pixel of which is expressed by RGB (Red, Green and Blue) values, directly in the RGB color space.

However, the above color feature extracting apparatus has the drawback that color feature extraction cannot be executed through color classification or color region distinction conforming to the human sense because the human sense is hard to distinguish a color difference in the green region when the distinction is made by directly evaluating the RGB values.

In view of the above, it can be considered to use the color space of L*a*b* color space (JIS Z8729-(1980)) for equalizing the distance of color difference. However, the L*a*b* color space has difficulties in being subjected to a transformation since greater importance is attached to the accuracy of color difference, and the way of color-expression is disadvantageously less familiar to the ordinary people.

SUMMARY OF THE INVENTION

Accordingly, the object of the present invention is to provide a color feature extracting apparatus, color feature extracting method and program storage medium thereof capable of easily transforming the RGB color space into a color space close to the human sense and executing color classification and color region distinction of a digital image in the transformed color space close to the human sense.

In order to achieve the above object, there is provided an image processing apparatus for extracting a color feature of an image from digital image data of the image comprising:

a color transformation controller for transforming an input image data of each pixel expressed by RGB values into HLS values through an HLS transformation;

a hue correction controller for correcting a hue value of the image data transformed into the HLS values by the color transformation controller so that a region between a green color and a yellow color in a direction of hue and a region between the green color and a light blue color in the direction of hue are narrowed and a region between a red color and the yellow color in the direction of hue is widened in an HLS color space represented by the HLS values; and an extraction controller for extracting color feature information of the image on the basis of the hue value of the image data corrected by the hue correction controller.

According to the above color feature extracting apparatus, the color transformation controller transforms the RGB values into the HLS values through the HLS transformation, and the color transformation controller corrects the hue value of the HLS values so that the region between the green color and the yellow color in the direction of hue and the region between the green color and the light blue color in the direction of hue are narrowed and the region between the red color and the yellow color in the direction of hue is widened bidirectionally in the color space represented by the transformed HLS values. With this arrangement, the region in the direction of hue of the green color of which the color difference is hard to be distinguished by the human visual sensation is reduced and the region in the direction of hue ranging from the red color to the yellow color to which the human visual sensation is sensitive is widened in the HLS color space, thereby providing a color space close to the human visual sensation. Therefore, when the extraction controller extracts the color features of the digital image in the HLS color space of which the hue value is corrected, the color difference can be calculated with a simple difference value without executing any complicated calculation. As described above, the RGB color space is simply transformed into the color space close to the human sense by the standard transformation of the RGB color space into the HLS color space and the correction of the hue value not by a high-accuracy transformation of the color space, so that the color features can be extracted by the color classification and color region distinction of the digital image in the transformed color space close to the human sense. Therefore, even if the distinguishing method based on the color classification and region extraction by color is simplified in extracting the color features of the digital image, then there can be obtained a result to which the user can consent. Each pixel in the RGB color space exists in the color space of the hue value, luminosity value and saturate value, and therefore, a color space that can be easily appreciated by the user results.

In an embodiment of the present invention, the image processing apparatus further comprising:

a luminosity correction controller for correcting a luminosity value of the image data transformed into the HLS values by the color transformation controller so that a region having a higher luminosity is widened and a region having a lower luminosity is narrowed in the HLS color space, the extraction controller extracting the color feature information of the image on the basis of the hue value of the image data corrected by the hue correction controller and the luminosity value of the image data corrected by the luminosity correction controller.

According to the above embodiment of the color feature extracting apparatus, the luminosity correction controller corrects the luminosity value of the HLS values so that the higher region in the direction of luminosity of the HLS values transformed by the color transformation controller is widened to have an increased number of subdivisions and the lower region in the direction of luminosity is narrowed to have a reduced number of subdivisions. That is, in the HLS space, the higher region in the direction of luminosity where the human visual sensation is sensitive to a difference in bright color is widened, while the lower region in the direction of luminosity where the human visual sensation is insensitive to a difference in dark color is reduced. Therefore, the correction of the hue value mentioned above and the correction of the luminosity value by the luminosity correction controller can provide an HLS color space closer to the human sense.

In an embodiment of the present invention, the image processing apparatus further comprising:

a management controller for managing the feature information extracted by the extraction controller in association with the image.

In order to achieve the above object, there is provided an image processing method for extracting a color feature of an image from digital image data of the image comprising:

a color transformation step for transforming an input image data of each pixel expressed by RGB values into HLS values through an HLS transformation;

a hue correction step for correcting a hue value of the image data transformed into the HLS values in the color transformation step so that a region between a green color and a yellow color in a direction of hue and a region between the green color and a light blue color in the direction of hue are narrowed and a region between a red color and the yellow color in the direction of hue is widened in an HLS color space represented by the HLS values; and an extraction step for extracting color feature information of the image on the basis of the hue value of the image data corrected in the hue correction step.

According to the above image processing method, the RGB values are transformed into the HLS values through the HLS transformation, and the hue value of the HLS values is corrected so that the region between the green color and the yellow color in the direction of hue and the region between the green color and the light blue color in the direction of hue are narrowed and the region between the red color and the yellow color in the direction of hue are widened bidirectionally in the color space represented by the transformed HLS values. With this arrangement, the region in the direction of hue of the green color of which the color difference is hard to be distinguished by the human visual sensation is reduced and the region in the direction of hue ranging from the red color to the yellow color to which the human visual sensation is sensitive is widened in the HLS color space, thereby providing a color space close to the human visual sensation. Therefore, when extracting the color features of the digital image in the HLS color space of which the hue value is corrected, the color difference can be calculated with a simple difference value without executing any complicated calculation. As described above, the RGB color space is simply transformed into the color space close to the human sense by the standard transformation of the RGB color space into the HLS color space and the correction of the hue value not by a high-accuracy transformation of the color space, so that the color features can be extracted by the color classification and color region distinction of the digital image in the transformed color space close to the human sense. Therefore, even if the distinguishing method based on the color classification and region extraction by color is simplified in extracting the color features of the digital image, then there can be obtained a result to which the user can consent. Each pixel in the RGB color space exists in the color space of the hue value, luminosity value and saturate value, and therefore, a color space that can be easily appreciated by the user results.

In an embodiment of the present invention, the image processing method further comprising:

a luminosity correction step for correcting a luminosity value of the image data transformed into the HLS values in the color transformation step so that a region having a higher luminosity is widened and a region having a lower luminosity is narrowed in the HLS color space, the extraction step extracting the color feature information of the image on the basis of the hue value of the image data corrected in the hue correction step and the luminosity value of the image data corrected in the luminosity correction step.

According to the above embodiment of the image processing method, the luminosity value of the HLS values is corrected so that the higher region in the direction of luminosity of the HLS values is widened to have an increased number of subdivisions and the lower region in the direction of luminosity is narrowed to have a reduced number of subdivisions. That is, in the HLS space, the higher region in the direction of luminosity where the human visual sensation is sensitive to a difference in bright color is widened, while the lower region in the direction of luminosity where the human visual sensation is insensitive to a difference in dark color is reduced. Therefore, the correction of the hue value mentioned above and the correction of the luminosity value can provide an HLS color space closer to the human sense.

In an embodiment of the present invention, the image processing method further comprising:

a management step for managing the feature information extracted in the extraction step in association with the image.

In order to achieve the above object, there is provided a computer program product in a memory for extracting a color feature of an image from digital image data of the image comprising:

color transformation control for transforming an input image data of each pixel expressed by RGB values into HLS values through an HLS transformation;

hue correction control for correcting a hue value of the image data transformed into the HLS values through the color transformation control so that a region between a green color and a yellow color in a direction of hue and a region between the green color and a light blue color in the direction of hue are narrowed and a region between a red color and the yellow color in the direction of hue is widened in an HLS color space represented by the HLS values; and extraction control for extracting color feature information of the image on the basis of the hue value of the image data corrected through the hue correction control.

According to the above program storage medium, the RGB values are transformed into the HLS values through the HLS transformation, and the hue value of the HLS values is corrected so that the region between the green color and the yellow color in the direction of hue and the region between the green color and the light blue color in the direction of hue are narrowed and the region between the red color and the yellow color in the direction of hue are widened in the color space represented by the transformed HLS values. With this arrangement, the region in the direction of hue of the green color of which the color difference is hard to be distinguished by the human visual sensation is reduced and the region in the direction of hue ranging from the red color to the yellow color to which the human visual sensation is sensitive is widened in the HLS color space, thereby providing a color space close to the human visual sensation. Therefore, when extracting the color features of the digital image in the HLS color space of which the hue value is corrected, the color difference can be calculated with a simple difference value without executing any complicated calculation. As described above, the RGB color space is simply transformed into the color space close to the human sense by the standard transformation of the RGB color space into the HLS color space and the correction of the hue value not by a high-accuracy transformation of the color space, so that the color features can be extracted by the color classification and color region distinction of the digital image in the transformed color space close to the human sense. Therefore, even if the distinguishing method based on the color classification and region extraction by color is simplified in extracting the color features of the digital image, then there can be obtained a result to which the user can consent. Each pixel in the RGB color space exists in the color space of the hue value, luminosity value and saturate value, and therefore, a color space that can be easily appreciated by the user results.

In an embodiment of the present invebtion, the computer program product further comprising:

luminosity correction control for correcting a luminosity value of the image data transformed into the HLS values through the color transformation control so that a region having a higher luminosity is widened and a region having a lower luminosity is narrowed in the HLS color space, the extraction control extracting the color feature information of the image on the basis of the hue value of the image data corrected through the hue correction control and the luminosity value of the image data corrected through the luminosity correction control.

According to the above embodiment of the program storage medium, the luminosity value of the HLS values is corrected so that the higher region in the direction of luminosity of the HLS values is widened to have an increased number of subdivisions and the lower region in the direction of luminosity is narrowed to have a reduced number of subdivisions. That is, in the HLS space, the higher region in the direction of luminosity where the human visual sensation is sensitive to a difference in bright color is widened, while the lower region in the direction of luminosity where the human visual sensation is insensitive to a difference in dark color is reduced. Therefore, the correction of the hue value mentioned above and the correction of the luminosity value can provide an HLS color space closer to the human sense.

In an embodiment of the present invention, the computer program product further comprising:

management control for managing the feature information extracted through the extraction control in association with the image.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The color feature extracting apparatus of the present invention will be described in detail below based on the embodiments thereof shown in the drawings.

Figure 1:
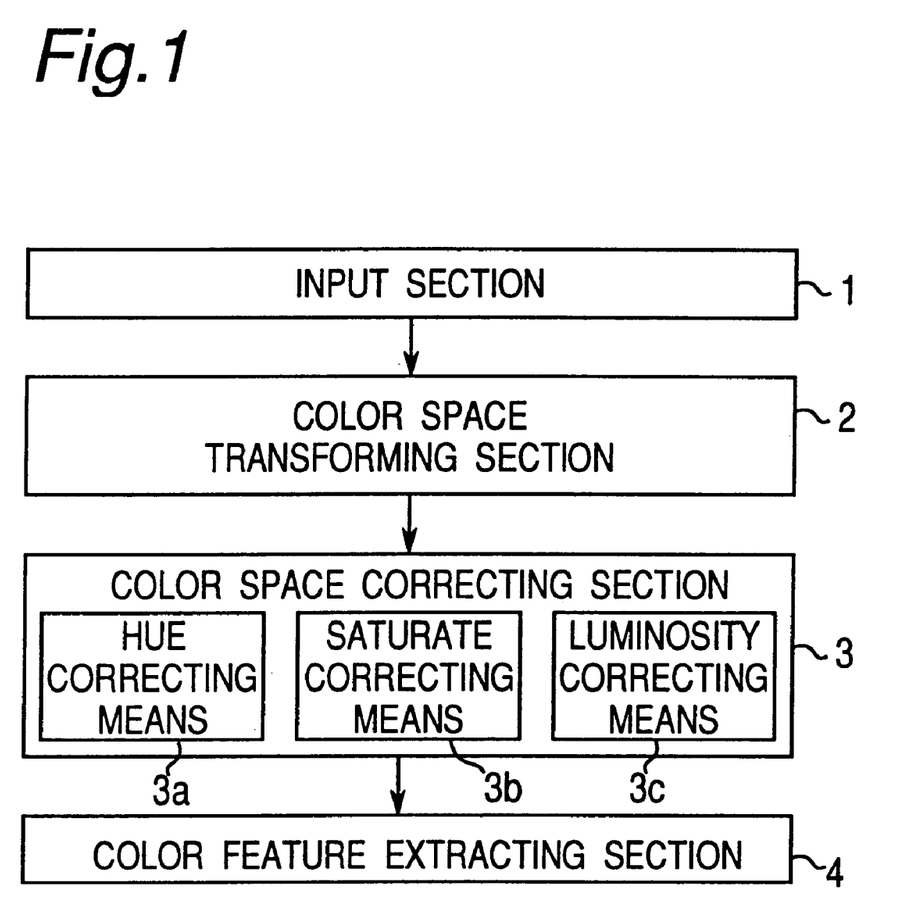
FIG. 1 is a function block diagram of a color feature extracting apparatus according to an embodiment of the present invention.

FIG. 1 is a function block diagram of a color feature extracting apparatus according to an embodiment of the present invention, including an input section 1 to which image data, various instructions and so on are inputted, a color space transforming section 2 as a color transformation controller for transforming RGB values into HLS values, a color space correcting section 3 for correcting the color space expressed by the HLS values from the color space transforming section 2 into a specified color space and a color feature extracting section 4 as an extraction controller for extracting the color features of the image data expressed by the HLS values corrected by the color space correcting section 3. The color space correcting section 3 has a hue correcting means 3a as a hue correction controller for correcting the hue so that the green region is reduced in the direction of hue, a saturate correcting means 3b for correcting the saturate by luminosity and a luminosity correcting means 3c for correcting the luminosity value so that the region of the higher luminosity value is widened to have an increased number of subdivisions and the region of the lower luminosity value is narrowed to have a reduced number of subdivisions.

Figure 2:
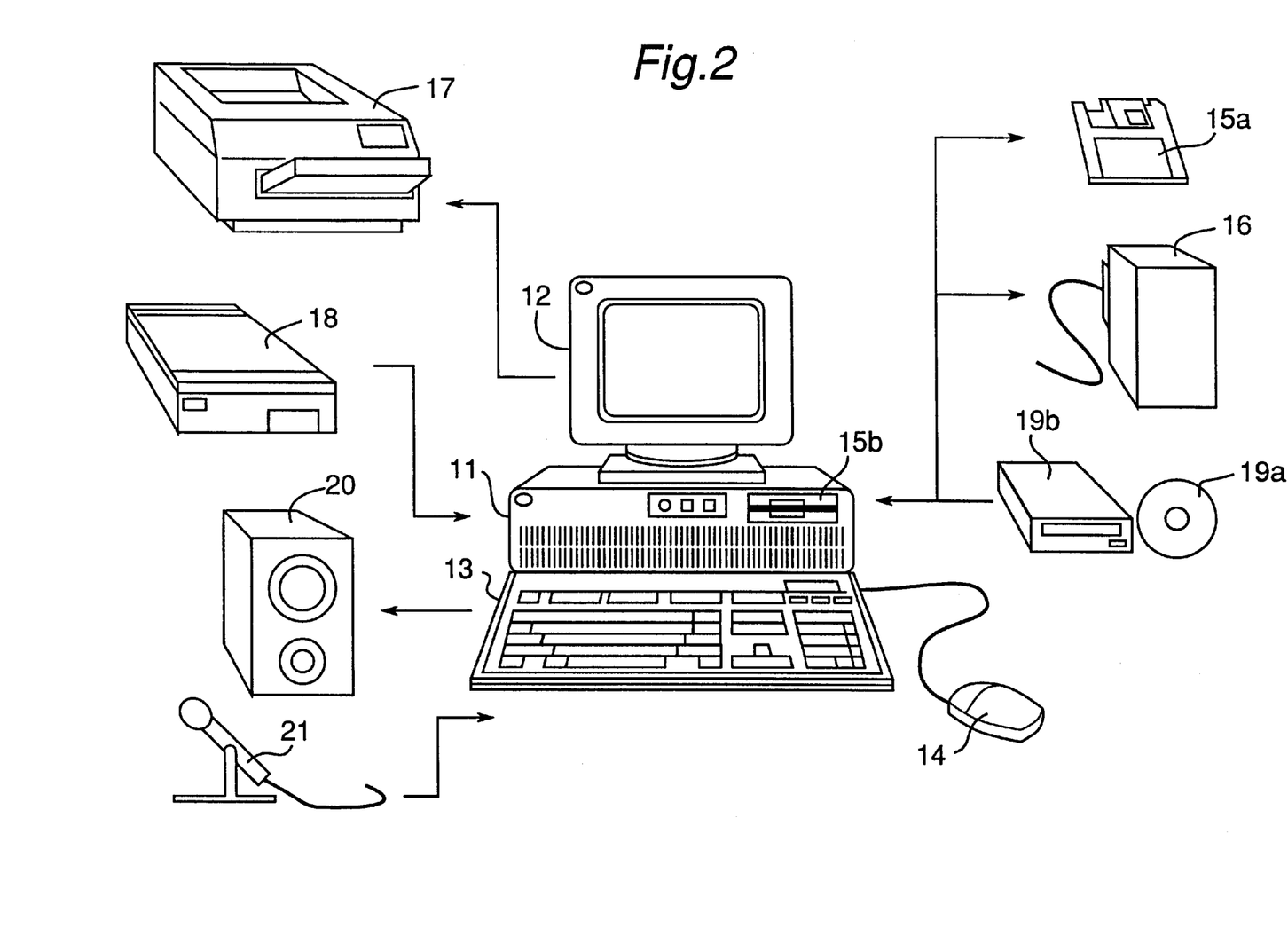
FIG. 2 is a diagram showing a hardware construction for implementing the function shown in FIG. 1.

FIG. 2 is a diagram showing the hardware construction for implementing the function shown in FIG. 1.

As shown in FIG. 2, the above color feature extracting apparatus is constructed of a control unit 11 for controlling the operation of the whole apparatus, a CRT (Cathode-Ray Tube) 12 for displaying images and letters as well as a variety of displays and the like for operation, a keyboard 13 and a mouse 14 for executing a variety of input operations, instructing operations and the like, a floppy disk drive 15b that is incorporated in the control unit 11 and executes recording and reproducing on a floppy disk 15a which serves as a data storage medium, a hard disk unit 16, a printer 17 for outputting image data, drawings and the like formed through image editing, a scanner 18 for capturing image data, a CD-ROM drive 19b for executing reproduction on a CD (Compact disc) 19a, a loudspeaker 20 for yielding an audio output and a microphone 21 for audio input. The above CRT 12, a keyboard 13, mouse 14, hard disk unit 16, printer 17, scanner 18, CD-ROM drive 19b, loudspeaker 20 and microphone 21 are connected to the control unit 11.

Figure 3:
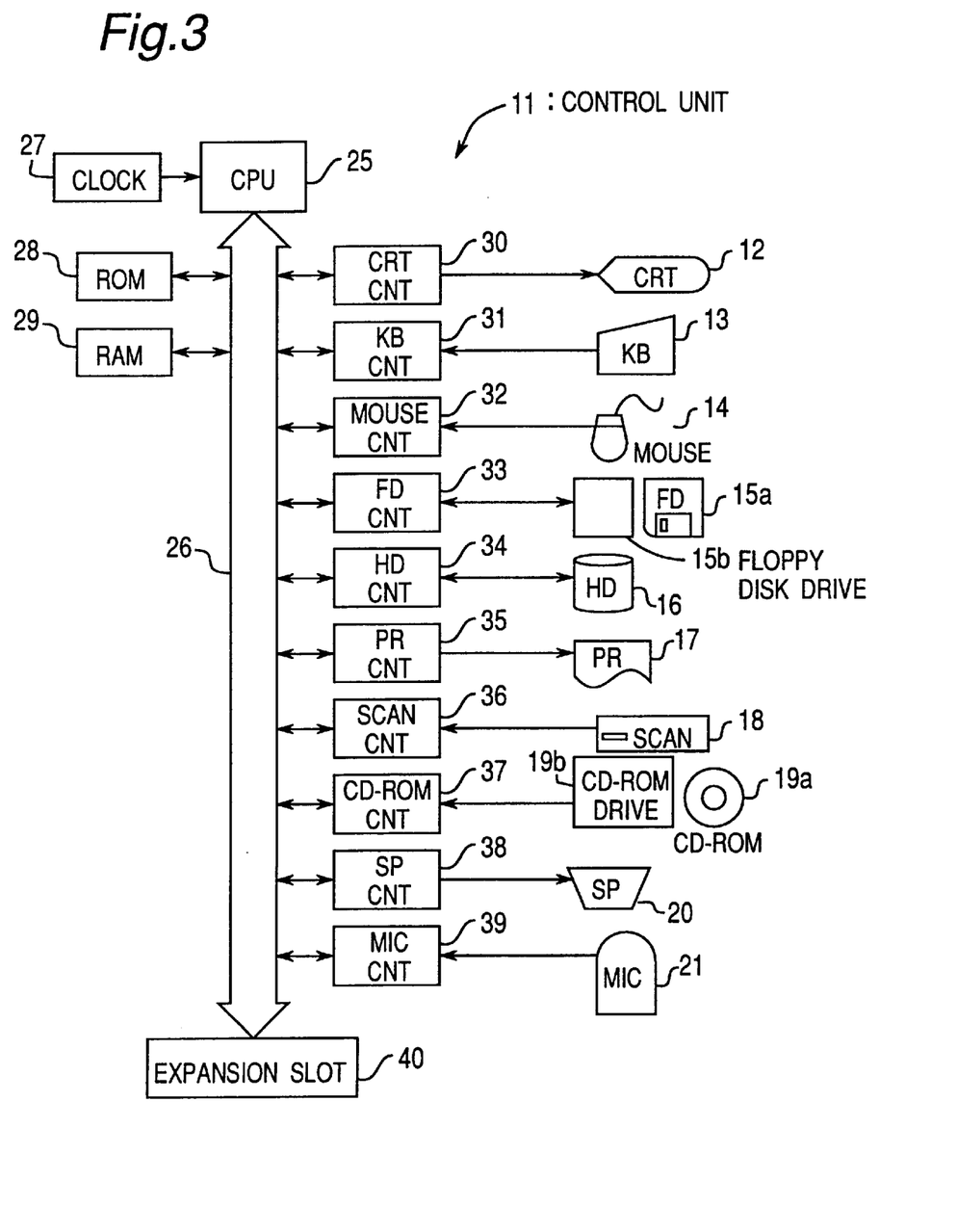
FIG. 3 is a block diagram of a CPU and its peripherals provided for the control device shown in FIG. 2.

FIG. 3 is a block diagram of a CPU (Central Processing Unit) 25 and its peripherals mounted in the control unit 11 shown in FIG. 1.

The above CPU 25 is implemented by, for example, the Model No. i80486DX or the like produced by Intel Corporation. Then, the CPU 25 is connected via a data bus 26 to a ROM (Read-Only Memory) 28 in which a program for controlling the whole apparatus is stored, a RAM (Random-Access Memory) 29 in which various data and programs are stored, a display control circuit 30 for displaying an image, letters or the like on the CRT 12, a keyboard control circuit 31 for controlling the transfer of an input from the keyboard 13, a mouse control circuit 32 for controlling the transfer of an input from the mouse 14, a floppy disk drive control circuit 33 for controlling the floppy disk drive 15b, a hard disk control circuit 34 for controlling the hard disk unit 16, a printer control circuit 35 for controlling an output to the printer 17, a scanner control circuit 36 for controlling the scanner 18, a CD-ROM drive control circuit 37 for controlling the CD-ROM drive 19b, a loudspeaker control circuit 38 for controlling the loudspeaker 20 and a microphone control circuit 39 for controlling the microphone 21.

The CPU 25 is also connected to a clock 27 for generating a reference clock necessary for operating the whole apparatus and connected via the data bus 26 to an expansion slot 40 for connecting a variety of expansion boards. It is also acceptable to connect an SCSII board to the expansion slot 40 for the connection of the floppy disk drive 15b, hard disk unit 16, scanner 18, CD-ROM drive 19b and so on.

In the above color feature extracting apparatus, the keyboard 13, mouse 14, scanner 18 and CD-ROM drive 19b constitute the input section 1, while the CPU 25 constitutes the color space transforming section 2, color space correcting section 3 and color feature extracting section 4.

Figure 4:
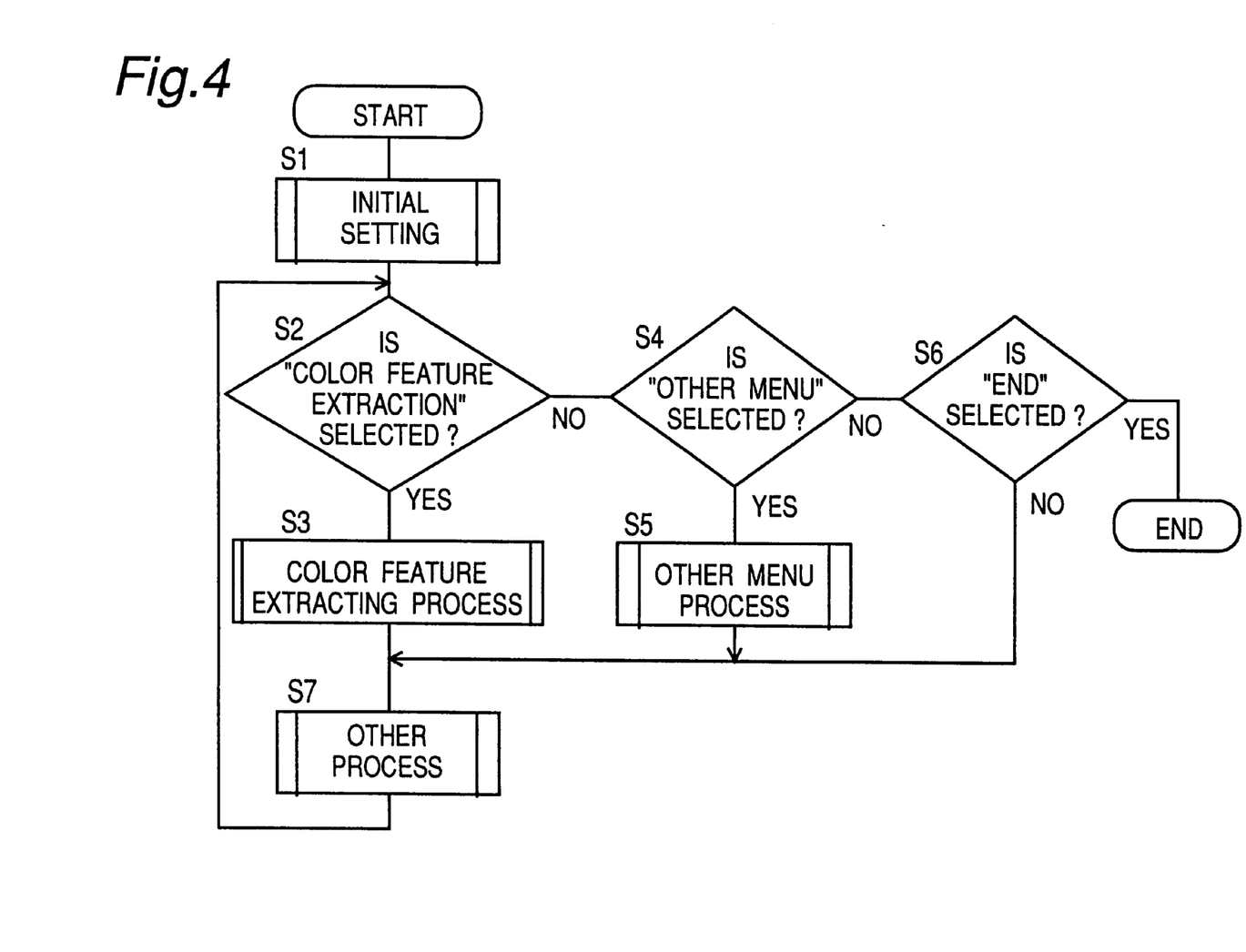
FIG. 4 is a flowchart for explaining the fundamental processing operation of the CPU shown in FIG. 3.
Figure 5:
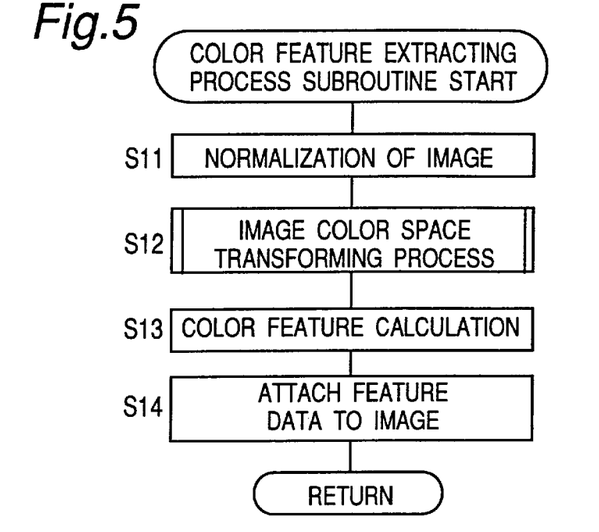
FIG. 5 is a flowchart of a color feature extracting process subroutine shown in FIG. 4.
Figure 6:
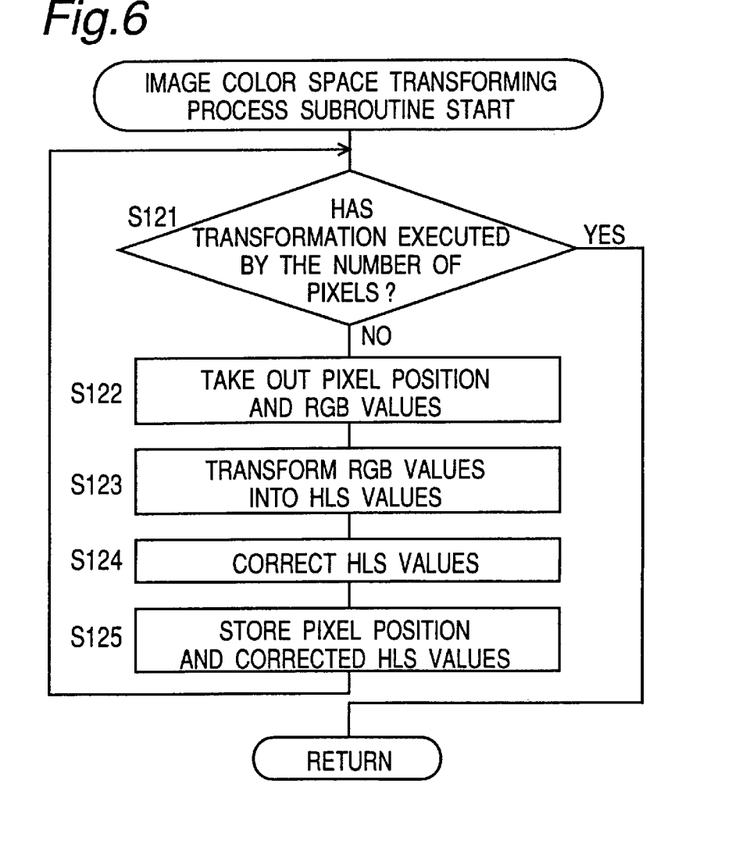
FIG. 6 is a flowchart of a color space transforming process subroutine shown in FIG. 5.

The color feature extracting apparatus having the above construction operates according to the flowcharts of FIG. 4, FIG. 5 and FIG. 6. FIG. 4 is a flowchart showing the main routine of a program for the above color feature extracting apparatus, FIG. 5 is a flowchart of the color feature extracting process subroutine shown in FIG. 4, and FIG. 6 is a flowchart of the image color space transforming process subroutine shown in FIG. 5.

In FIG. 4, first, when the program is started, initialization of flags, initial screen display and so on necessary for the processes described later are executed in step S1.

Next, the program flow proceeds to step S2 to decide whether or not a "color feature extraction" of a job menu is selected from the initial screen displayed on the CRT 12. When it is determined that the "color feature extraction" is selected, the program flow proceeds to step S3 to execute a color feature extraction process, and the program flow proceeds to step S7. When it is determined that the "color feature extraction" is not selected in step S2, the program flow proceeds to step S4.

Next, it is decided in step S4 whether or not the "other menu" is selected. When it is determined that the "other menu" is selected, the program flow proceeds to step S5 to execute the other menu process, and the program flow proceeds to step S7. When it is determined that the "other menu" is not selected, the program flow proceeds to step S6.

Then, it is decided in step S6 whether or not the "end" is selected. When it is determined that the "end" is selected, this process ends. When it is determined in step S6 that the "end" is not selected, the program flow proceeds to step S7 to execute the other process in step S7, and the program flow returns to step S2.

The color feature extracting process in step S3 will be described below. The other steps are not directly related to the present invention, and therefore, no detailed description is provided for them.

When the menu of the color feature extracting process is selected in the main routine of FIG. 4, the subroutine of the color feature extracting process shown in FIG. 5 is executed.

In FIG. 5, normalization of the image is executed in step S11, thereby making the digital image have an appropriate size to reduce the time of the color feature extracting process.

Next, the program flow proceeds to step S12 to execute a color space transforming process of the image.

Next, the program flow proceeds to step S13 to calculate the color feature of the digital image utilizing the transformed color value of each pixel.

Next, the program flow proceeds to step S14 to give feature data to the image. That is, the extracted color feature is attached to the attribute of the digital image so as to allow the color feature to be utilized for another process.

Then, this color feature extracting process ends, and the program flow returns to the main routine shown in FIG. 4.

FIG. 6 shows a flowchart of a color space transforming process subroutine of the digital image in step S12 of FIG. 5. By this color space transforming process, the color of each pixel of the digital image is transformed from the RGB values to the HLS values.

In FIG. 6, it is decided in step S121 whether or not the transformation has been executed by the number of pixels. When it is determined that the transformation has been executed by the number of pixels, the program flow proceeds to step S122.

Next, the program flow proceeds to step S122 to take out the pixel position and the RGB values.

Next, the program flow proceeds to step S123 to transform the RGB value into the HLS value.

Next, the program flow proceeds to step S124 to correct the transformed HLS values.

Then, the program flow proceeds to step S125 to store the pixel position and the HLS values. That is, the pixel positions of the digital image and the HLS values obtained through the transforming process are stored so as to be used for color feature calculation (step S13 in FIG. 5).

When it is determined in step S121 that the transformation has been executed by the number of pixels, this color space transforming process ends, and the program flow returns to the color feature extracting process shown in FIG. 5.

The process of transformation from the RGB values to the HLS values in step S123 shown in FIG. 6 will be described below.

Figure 7:
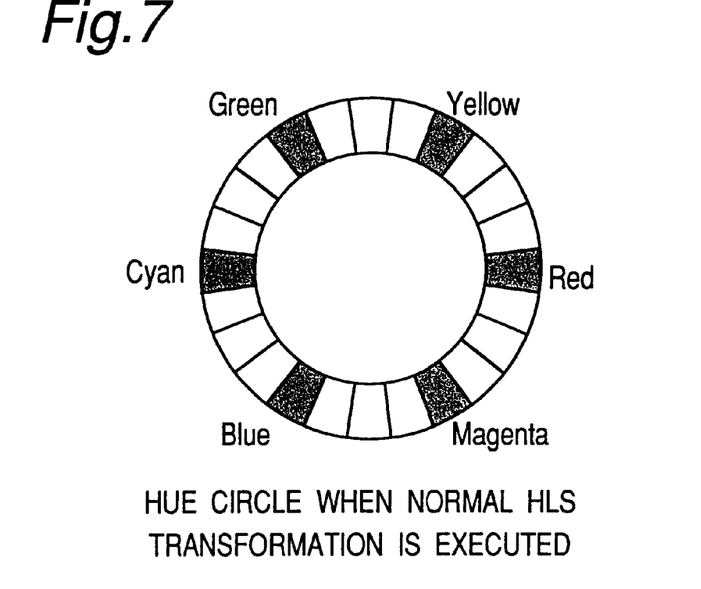
FIG. 7 is a view showing a hue circle in the case where the normal transformation is executed.

First, the RGB values on the digital image are transformed into the HLS values through the standard HLS transformation. FIG. 7 shows a hue circle in the case where the above standard HLS transformation is executed.

Next, the above transformed HLS values (h, 1, s) are further transformed into HLS values that are put closer to the human sense.

(1) Concerning the hue

The following transformation is executed with the RGB values (r, g, b) of the most vivid color in an identical hue. That is, after inversely transforming the above transformed HLS values into the RGB values (r, g, b) that make a vivid color with the luminosity value set to 0.5 and the saturate value set to 1.0 among the transformed HLS values, the following setting is provided with R'=0.5r, G'=0.66g and B'=0.5b

R=R'/(R'+G'+B')
G=G'/(R'+G'+B')
B=B'/(R'+G'+B')

Figure 8:
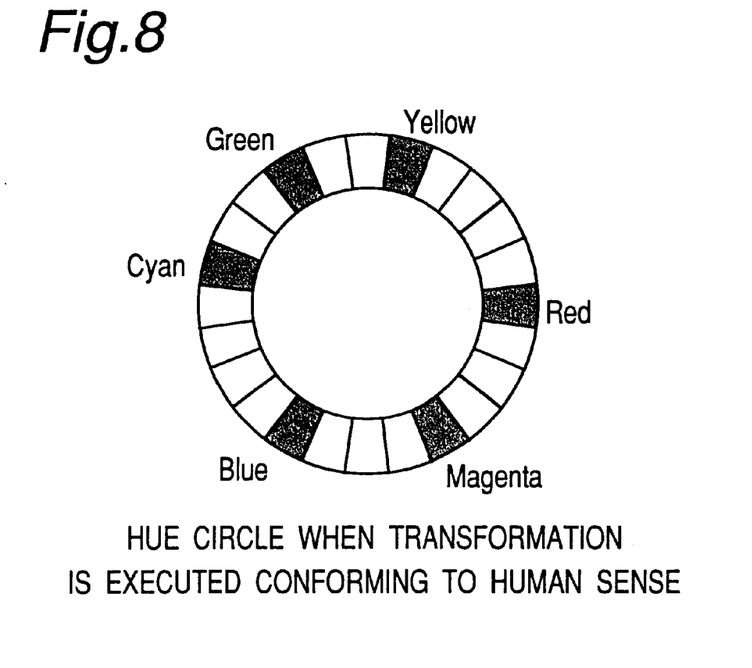
FIG. 8 is a view showing a hue circle in the case where a transformation is executed in conformity to the human sense.

Then, the above RGB values (R, G, B) are subjected to the standard HLS transformation, and only the hue value of the transformed HLS values is used. Through this hue correction, the hue that ranges from the red color to the yellow color and exhibits a great variation is made to have an increased number of subdivisions and the hue that ranges from the yellow color to the light blue color (cyan) and exhibits a small variation is made to have a reduced number of subdivisions as shown in FIG. 8 in comparison with the hue circle in the case where the normal HLS transformation is executed as shown in FIG. 7.

(2) Concerning the saturate

Next, the saturate value (s) is transformed utilizing the luminosity (l) so that the black and white value is definitely determined to one value, thereby providing a saturate (S).

S=s·d provided that d=−2.0·l+2.0 (l≧0.5) and d=2.0·l (l<0.5)

(3) Concerning the luminosity

Next, a transformation is executed so that a smooth change in luminosity occurs utilizing the saturate value (S) obtained in connection with the above item (2) and the way of thinking of the gamma characteristic ($\gamma$) of the monitor, thereby providing a luminosity value (L). That is, with the setting:

$\gamma$=1.2 lmn=0.5·S lmx=−0.5·S+1.0 l'=(l−lmn)/(lmx−lmn)

l'=l'$^\gamma$ the luminosity value (L) is obtained by:

L=l"(lmx−lmn)+lmn

Figure 9:
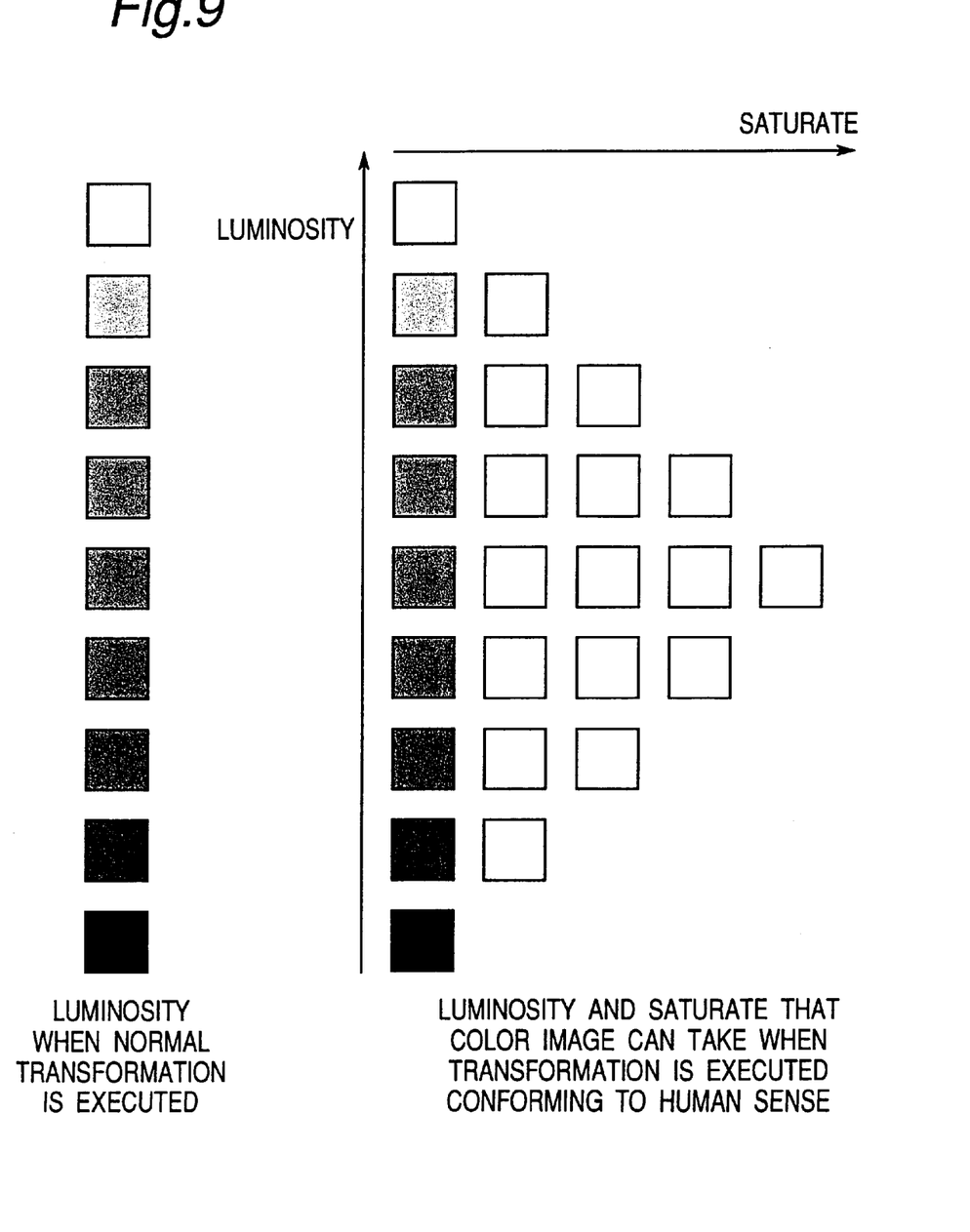
FIG. 9 is a view showing a range in which RGB values exist in the direction of luminosity and in the direction of saturate in a transformed color space.
Figure 10:
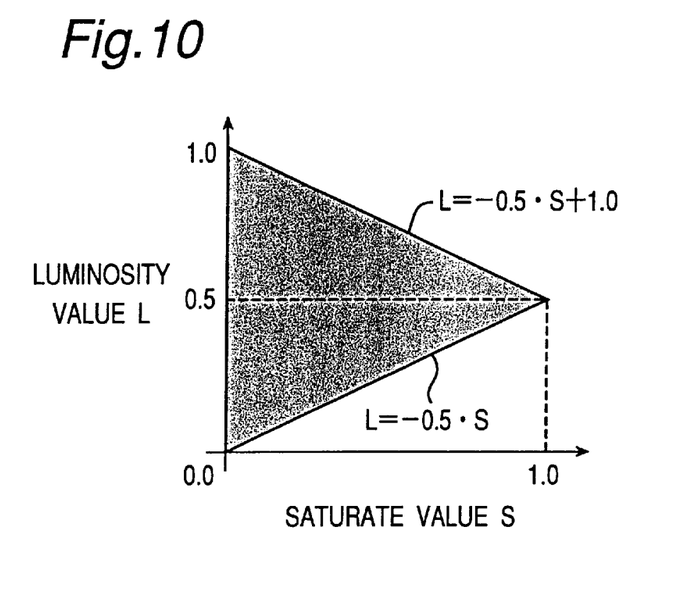
FIG. 10 is a view showing a relation between a luminosity value and a saturate value in the transformed color space.

FIG. 9 shows the image of a color that can take the above luminosity and saturate, where the bright region is widened to have an increased number of subdivisions and the dark region is narrowed to have a reduced number of subdivisions. FIG. 10 shows a range in which the RGB values exist in the direction of luminosity and the direction of saturate. As shown in FIG. 10, the saturate value S gradually increases from 0.0 to become 1.0 in direct proportion to the luminosity value L in a range in which the luminosity value L is 0.0 to 0.5, and the saturate value S gradually decreases from 1.0 to become 0.0 in direct proportion to the luminosity value L in a range in which the luminosity value L is 0.5 to 1.0.

The feature quantity calculation in step S13 shown in FIG. 5 will be described below. As a color feature obtained from the colors of the digital image, there can be enumerated the color occupying a large area in the image, the color of an object located in the image and the like. Here is provided the description of the extraction of these two feature quantities.

(a) How to obtain the color occupying a large area in the image (i) First, the HLS color space is divided.

(ii) Next, the HLS values of each pixel are classified, and the representative color and the occupation ratio of each color inside the image are calculated.

(iii) Next, a plurality of representative colors having a great occupation ratio are adopted as the color features of this image.

The values of the representative colors are expressed by the HLS values obtained by transforming the RGB values into a color space fit to the human sense, and therefore, the values becomes easy to be intuitively appreciated by the user.

(b) How to obtain the color of an object located in an image (i) First, the HLS color space is divided.

(ii) Next, an identical number is attached to the HLS values of an identical group.

Figure 11:
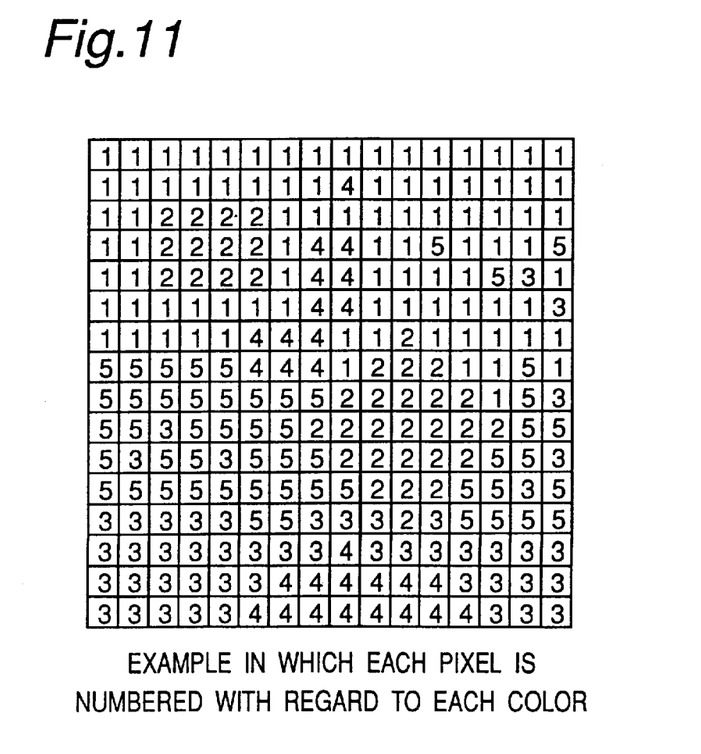
FIG. 11 is a view showing an example in which each pixel is numbered with regard to each color.

(iii) Next, a matrix corresponding to pixel positions is formed, and the above number obtained from the HLS values of each pixel is stored (shown in FIG. 11).

(iv) Next, when an identical number is attached to adjacent regions, the regions are renumbered by determining that the regions are included in one region.

(v) Next, the average color of each region is obtained, and a threshold value is calculated from the maximum color difference between the regions.

(vi) Next, when the color difference between the regions is not higher than the threshold value, the regions are merged into an identical region.

(vii) Next, a region covering a large area near the edges of the image is regarded as a background, and this region is eliminated from the candidate object regions.

(viii) Next, an image in a region having a small occupation ratio to the image is also eliminated from the candidate object regions.

Figure 12:
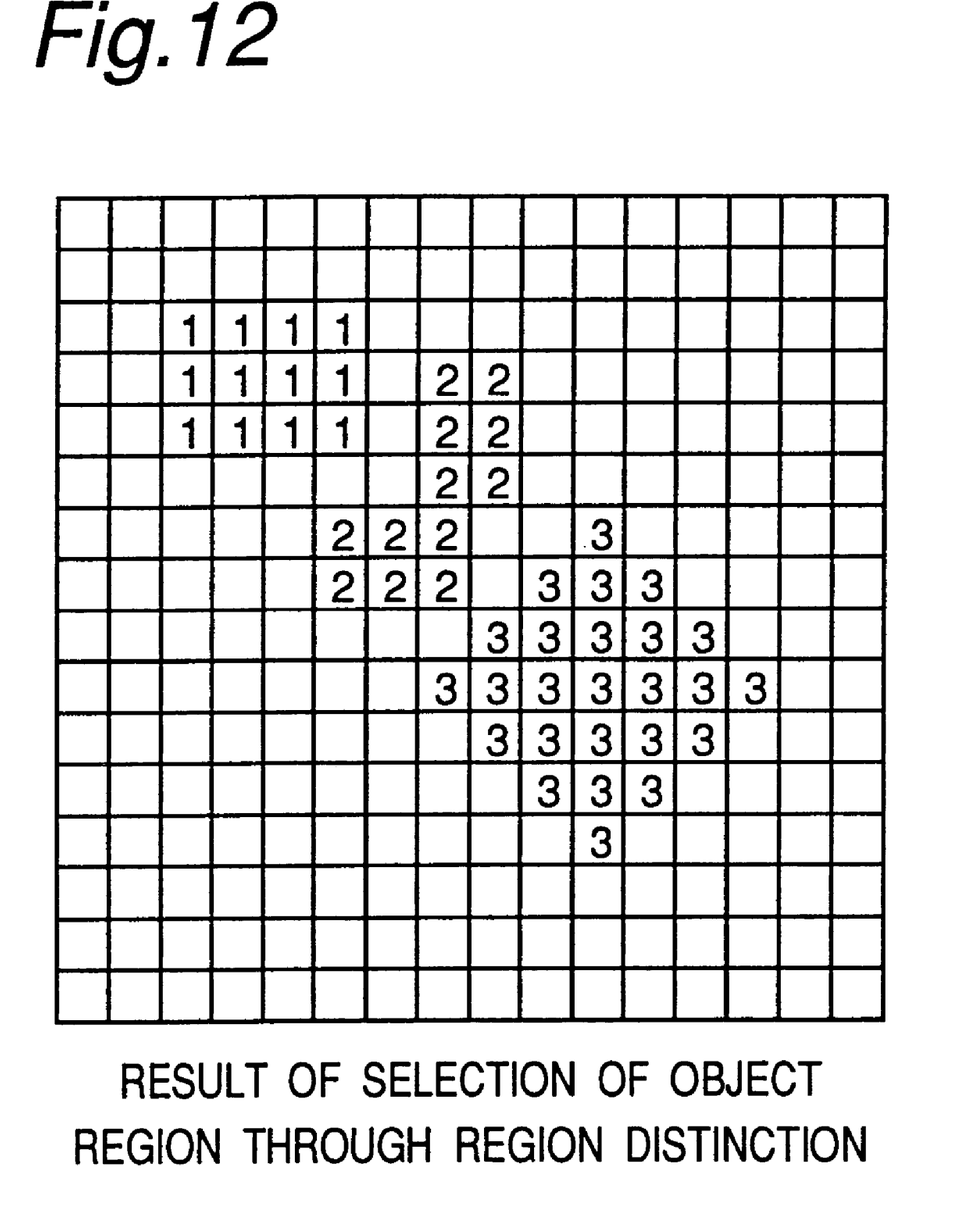
FIG. 12 is a view showing a result of selection of an object region through region distinction in FIG. 11.

(ix) Then, the remaining region is regarded as the object region, and the position, shape and average color of each object region are adopted as the color features of this image (shown in FIG. 12).

As described above, the RGB values are transformed into the color space fit to the human sense, and therefore, the color difference between colors can be obtained by the simple difference values of the hue value, luminosity value and saturate value, so that the combining of the regions by the closeness of the colors can be easily achieved.

Therefore, the above color feature extracting apparatus is able to preparatorily transform the RGB values into the color space close to the human sense by the simple transformation expression by the color space transforming section 2 and the color space correcting section 3 and extract the color feature by the color feature extracting section 4 through the color classification and color region distinction inside the image in the transformed color space close to the human sense, thereby allowing an extraction result close to the human sense to be obtained. Each pixel in the RGB color space exists in the transformed color space of the hue, luminosity and saturate, and therefore, the color space is easy to be appreciated by the user.

By correcting the luminosity value by the luminosity correcting means 3c of the color space correcting section 3, the higher region in the direction of luminosity where the human visual sensation is sensitive to a difference in bright color is widened, while the lower region in the direction of luminosity where the human visual sensation is insensitive to a difference in dark color is merged. Therefore, an HLS color space closer to the human sense can be provided by the correction of the luminosity value.

Although the color space in which the hue value, luminosity value and saturate value of the standard transformed HLS values are each corrected is divided for use in calculating each color feature obtained from the colors of the digital image in the above embodiment, it is also acceptable to use in a dividing manner the color space in which only the hue value is corrected or a color space in which the hue value and the luminosity value are corrected. It is also acceptable to extract each color feature of the digital image on the basis of only the corrected hue value of the standard transformed HLS values or on the basis of only the corrected hue value and luminosity value of the HLS values.

Although the image data storage medium is constituted by the floppy disk 15a and the hard disk unit 16 in the above embodiment, it is also acceptable to use another information storage device such as a magneto-optic disk. Although the scanner 18 and the CD-ROM drive 19b are employed as the input section 1, it is also acceptable to employ another input device such as a still video camera or a digital camera. Although the printer 17 is employed as the output device, it is also acceptable to employ another output device such as a digital copying machine.

Although the above embodiment has been described in connection with the color feature extracting apparatus in which the program for controlling the whole apparatus is stored in the ROM 28, it is also acceptable to store a part or the whole of the program of the present invention into a program storage medium such as a floppy disk and read at need the above program into a device such as a personal computer for execution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus for extracting a color feature of an image from digital image data of the image, comprising:

a color transformation controller for transforming an input image data of each pixel expressed by RGB values into HLS values through an HLS transformation;

a hue correction controller for correcting a hue value of the image data transformed into the HLS values by the color transformation controller so that a region between a green color and a yellow color in a direction of hue and a region between the green color and a light blue color in the direction of hue are narrowed and a region between a red color and the yellow color in the direction of hue is widened in an HLS color space represented by the HLS values; and an extraction controller for extracting color feature information of the image on the basis of the hue value of the image data corrected by the hue correction controller.

2. An image processing apparatus as claimed in claim 1, further comprising:

a luminosity correction controller for correcting a luminosity value of the image data transformed into the HLS values by the color transformation controller so that a region having a higher luminosity is widened and a region having a lower luminosity is narrowed in the HLS color space, the extraction controller extracting the color feature information of the image on the basis of the hue value of the image data corrected by the hue correction controller and the luminosity value of the image data corrected by the luminosity correction controller.

3. An image processing apparatus as claimed in claim 2, further comprising:

a management controller for managing the feature information extracted by the extraction controller in association with the image.

4. An image processing method for extracting a color feature of an image from digital image data of the image, comprising:

a color transformation step for transforming an input image data of each pixel expressed by RGB values into HLS values through an HLS transformation;

a hue correction step for correcting a hue value of the image data transformed into the HLS values in the color transformation step so that a region between a green color and a yellow color in a direction of hue and a region between the green color and a light blue color in the direction of hue are narrowed and a region between a red color and the yellow color in the direction of hue is widened in an HLS color space represented by the HLS values; and an extraction step for extracting color feature information of the image on the basis of the hue value of the image data corrected in the hue correction step.

5. An image processing method as claimed in claim 4, further comprising:

a luminosity correction step for correcting a luminosity value of the image data transformed into the HLS values in the color transformation step so that a region having a higher luminosity is widened and a region having a lower luminosity is narrowed in the HLS color space, the extraction step extracting the color feature information of the image on the basis of the hue value of the image data corrected in the hue correction step and the luminosity value of the image data corrected in the luminosity correction step.

6. An image processing method as claimed in claim 5, further comprising:

a management step for managing the feature information extracted in the extraction step in association with the image.

7. A computer program product in a memory for extracting a color feature of an image from digital image data of the image, comprising:

color transformation control for transforming an input image data of each pixel expressed by RGB values into HLS values through an HLS transformation;

hue correction control for correcting a hue value of the image data transformed into the HLS values through the color transformation control so that a region between a green color and a yellow color in a direction of hue and a region between the green color and a light blue color in the direction of hue are narrowed and a region between a red color and the yellow color in the direction of hue is widened in an HLS color space represented by the HLS values; and extraction control for extracting color feature information of the image on the basis of the hue value of the image data corrected through the hue correction control.

8. A computer program product as claimed in claim 7, further comprising:

luminosity correction control for correcting a luminosity value of the image data transformed into the HLS values through the color transformation control so that a region having a higher luminosity is widened and a region having a lower luminosity is narrowed in the HLS color space, the extraction control extracting the color feature information of the image on the basis of the hue value of the image data corrected through the hue correction control and the luminosity value of the image data corrected through the luminosity correction control.

9. A computer program product as claimed in claim 8, further comprising:

management control for managing the feature information extracted through the extraction control in association with the image.

* * * * *